United States Patent [19]
Zheng et al.

[11] Patent Number: 5,572,313
[45] Date of Patent: Nov. 5, 1996

[54] DETERMINATION OF ANGULAR OFFSET BETWEEN OPTICAL FIBERS HAVING OPTICAL, AXIAL ASYMMETRY AND ALIGNMENT AND SPLICING OF SUCH FIBERS

[75] Inventors: Wenxin Zheng, Solna; Ola Hultén, Bromma; Mats Bengtsson, Stockholm, all of Sweden

[73] Assignee: Telefonaktiebolaget LM Ericsson, Stockholm, Sweden

[21] Appl. No.: 350,998

[22] Filed: Nov. 29, 1994

[30] Foreign Application Priority Data

| Nov. 29, 1993 | [SE] | Sweden | 9303973 |
| Nov. 29, 1993 | [SE] | Sweden | 9303974 |
| Mar. 8, 1994 | [SE] | Sweden | 9400780 |

[51] Int. Cl.$^6$ ............................ G01B 11/27
[52] U.S. Cl. ............................ 356/73.1
[58] Field of Search ............................ 356/73.1

[56] References Cited

U.S. PATENT DOCUMENTS

| 5,002,351 | 3/1991 | Szanto et al. | |
| 5,013,345 | 5/1991 | Itoh et al. | 65/4.2 |
| 5,046,813 | 9/1991 | Itoh et al. | 385/96 |
| 5,170,456 | 12/1992 | Itoh et al. | 385/96 |
| 5,323,225 | 6/1994 | Dyott | 356/73.1 |

FOREIGN PATENT DOCUMENTS

| 0 504 519 | 9/1992 | European Pat. Off. . |
| 37 24 914 | 2/1989 | Germany . |
| 40 25 351 | 2/1992 | Germany . |
| 63-106706 | 5/1988 | Japan . |
| 2-6908 | 1/1990 | Japan . |
| 9100978 | 4/1991 | Sweden . |
| 9201235 | 4/1992 | Sweden . |
| 9100979 | 10/1992 | Sweden . |
| 9300522 | 2/1993 | Sweden . |
| 9201818 | 12/1993 | Sweden . |
| 9201817 | 12/1993 | Sweden . |
| 2 201 529 | 9/1988 | United Kingdom . |

OTHER PUBLICATIONS

I. Yokohama et al., "Fiber–Coupler Fabrication with Automatic Fusion–Elongation Processes for Low Excess Loss and High Coupling–Ratio Accuracy", *IEEE Journal of Lightwave Technology*, vol. LT-5, No. 7, Jul. 1987, pp. 910-915.

*Primary Examiner*—Vincent P. McGraw
*Attorney, Agent, or Firm*—Burns, Doane, Swecker & Mathis

[57] ABSTRACT

In the determination of the angular offset between axial asymmetries, in particular between optically inhomogeneous regions in optically transparent bodies, such as stress concentration zones of optical PM-fibers or fiber cores of optical twin core fibers, located in arbitrary angular start positions, the ends of the fibers are illuminated during rotations thereof to different angular positions around their longitudinal axes. For different angular positions the difference is then determined between light, which has passed through the fiber end and in its position corresponds to the central part of the fiber, and light, which has passed through the fiber end and in its position corresponds to the region of the fiber located immediately outside the central part. These differences, considered as functions of the rotation angle, constitute curves for the fiber ends. The curves are compared and are translated in a parallel way to a new angular position, where a maximum agreement is obtained in the shape of the curves. The angle between the curves in this angular position gives the angular offset between for example the plane through the stress zones or the fiber cores in the start positions thereof and this angle is used for rotating the fiber ends, so that these planes and thus the stress zones or the fiber cores in the fiber ends will be aligned with each other.

26 Claims, 9 Drawing Sheets

DETERMINATION OF ANGULAR OFFSET BETWEEN OPTICAL FIBERS HAVING OPTICAL, AXIAL ASYMMETRY AND ALIGNMENT AND SPLICING OF SUCH FIBERS

BACKGROUND

The present invention relates to methods and devices for determination of the angular offset about a longitudinal axis between two primarily similar optical bodies or fibers which each one is axially asymmetric as to its optical properties, and in particular contains at least one eccentrically placed and optically interfering region extending in the longitudinal direction of the fibers, and for aligning these bodies or ends so that the positions of the axial asymmetries coincide, that is in particular the positions of the optically interfering regions coincide angularly about the longitudinal axis of the fibers and the optically interfering regions can be positioned aligned with each other and against each other and then splicing the fiber ends to each other maintaining the alignment of asymmetries, that is in particular of the eccentric, optically interfering regions. In particular the invention relates to methods and devices for determination of the angular offset between the polarization axes of two ends of PM-fibers and for aligning these ends so that the polarization axes coincide and then splicing the fiber ends to each other with a maintained coincidence of the polarization axes so that hereby the polarization of light is well conserved at the transfer between the fiber ends. The invention also relates to methods and devices for determination of the angular offset of planes extending centrally through the two cores in two ends of optical fibers of the kind having double or twin cores and aligning these ends so that the planes coincide or in any case are parallel each other and then splicing the fiber ends to each other maintaining the alignment or parallelism of the planes through the cores.

Optical fibers of standard type comprise a cladding having an essentially circular-cylindrical outer envelope surface and a thin fiber core which is placed rather centrally in the cladding and in the ideal case is located along the longitudinal axis of the outer cylindrical surface and thus has the same longitudinal axis as it. Different methods have been developed to splice fibers having more or less eccentrically located cores, see for instance our earlier Swedish patent applications No. 9100978-7, "Splicing optical fibers", filed Apr. 3, 1991, and No. 9201235-0 "Control of arc fusion in splicing optical fibers", filed Apr. 16, 1992. In these methods no rotation of the fiber ends is required in the splicing operation but only an offset in two lateral directions of one fiber end in order to obtain an alignment of the cores, these methods being in particular intended for the case with somewhat eccentrically located fiber cores. Then a small offset of the exterior surfaces of the claddings is obtained in the finished fiber splice, which is seen as a small step in the longitudinal direction of the spliced fiber. If a rotation thereby of one of the fiber ends also could be introduced, also an alignment of the exterior surfaces of the claddings could be obtained.

Optical PM-fibers are used in such contexts where the polarization state in the transfer of the information through the optical fiber must be strictly controlled, e.g. in sensor contexts.

Commercially available polarization maintaining fibers are constructed as conventional optical fibers having a centrally located core and a surrounding cladding with a cylindrical exterior surface. There is in addition in the cladding, as seen in a cross section, two essentially identical regions of highly doped glass, usually silicon glass doped with $B_2O_3$, so-called stress zones, stress concentration zones or stress generating zones, which are located at opposite, diametrically opposite sides of the fiber core. Two such diametrically opposite regions located symmetrically about the longitudinal axis of the fiber extend along the whole fiber. In elliptical jacket fibers there is an ellipsoidal zone centrally inside the cladding, concentric with the core.

In a polarization maintaining fiber there are two polarization modes perpendicular to each other for light transferred in the fiber. They have their magnetic and electric field vectors located along either one of the two perpendicular polarization axes of the fiber, which are also perpendicular to each other, one of which, as seen in a cross section through the fiber, extends centrally through the stress concentration zones.

In the connection of such PM-fibers to each other it is naturally important that the stress zones of the two ends of the fibers are located opposite to each other before the actual splicing procedure so that the polarization axes of the fibers are aligned with each other. A good alignment results in a low cross talk of the polarization modes for light passing through the splice, that is a higher extinction ratio can be achieved.

Optical twin-core fibers having two cores where the cores are designed in the same way as for single mode fibers but are located for instance essentially symmetrically along a diameter plane in the surrounding circular cylindrical cladding constitutes a material in the research of many linear and non-linear phenomena which are based on interaction between the evanescent fields of the basic modes of the cores. They comprise simple beam splitters, fiber sensors and non-linear switches.

A large disadvantage associated with the use of such fibers is, however, the difficulty both in exciting and detection of signals in the two cores owing to their small size and owing to the fact that they are located relatively close to each other. A typical core radius in a fiber having two cores is about 3–4 μm and a typical distance between the two cores is of the magnitude of order a few radii of the core. It is impossible to accomplish a but joint between an optical fiber having a single core of standard type to a fiber having double cores and between two fibers having double cores by means of the conventional splicing methods without performing a rotation of one of the fiber ends which are to be spliced.

A method which has been used to overcome this problem is to use large optical elements and lenses for focusing the input light to the cores. Such methods, however, suffer from high losses in the introduction (7–8 dB) of light, what together with the disadvantage of using large optical components, for instance due to their insufficient stability, make them unsuited for practical use.

Optical PM-fibers and twin-core fibers have the common characteristic of a lacking axial symmetry considered as optical bodies, that is there are non-axial longitudinal optical inhomogeneities or optically interfering regions extending along the fiber. To perform a splice to a similar optical fiber they must be rotated through a measured and/or calculated angle about their longitudinal axes to align the asymmetric regions with each other.

In our earlier Swedish patent application No. 9300522-1, "Alignment and splicing of optical PM-fibers", filed Feb. 17, 1993, it is disclosed how an optical PM-fiber can be given a definite angular position about its longitudinal axis and how this positioning can be used to provide good splices between two optical PM fibers. In the determination the fiber is illuminated with light and the lens effect is observed therein, i.e. the light intensity is determined for light passing through the fiber. A light intensity curve perpendicular to the fiber axis then generally has a maximum corresponding to the core or the central region of the optical fiber. Outside this maximum there is a region having a lower light intensity but where the light intensity still can be rather constant on the said line. Regions outside the exterior surface of the fiber will have a light intensity approximately corresponding to the light intensity without a fiber. The lens effect is constituted by the contrast of the central region having a high light intensity and the region located most adjacent thereto. In order to achieve a positioning a fiber is rotated so that the lens effect will be either maximal or minimal.

In U.S. Pat. No. 5,013,345 for Itoh et al. a method of aligning optical PM-fibers is disclosed utilizing high-precision, costly optical elements, where first one fiber is observed in a predetermined direction to form a reference image, and then the ends of the PM-fibers are both rotated and observed during the rotation, the rotation a fiber end being interrupted when the image thereof coincides with the reference image.

SUMMARY

It is an object of the invention to provide a method and a device for an angular alignment between optical fibers and in the general case of two optical transparent bodies so that axial asymmetries, in particular optically inhomogeneous or optically interfering portions of the bodies are aligned with or positioned in line with each other in a simple way with a minimum amount of extra devices for use in available automatic fiber splicing machines comprising standard optical elements.

It is a further object of the invention to provide a method and a device for positioning and splicing two optical fibers so that axial asymmetries, in particular optical inhomogeneous portions of the fiber splice, such as stress zones or fiber cores in the fibers, are aligned with each other in a simple way with a minimum amount of extra devices for use in available automatic fiber splicing machines.

It is a further object of the invention to provide a method and a device for splicing optical PM-fibers so that in the splice the polarization axes of the fibers are aligned with each other.

It is a further object of the invention to provide a method and a device for splicing optical fibers having double cores so that in the splice the fiber cores in the fibers are aligned with each other.

In the determination of the angular offset or the angular position in relation to each other between axial asymmetries, in particular optically inhomogeneous regions in two ends of an optical fiber, generally in two cylindrical bodies, and in the special case the plane through the stress zones or two cores of two ends, located in arbitrary angular start positions, of optical fibers of the polarization maintaining kind or the kind having two cores respectively, the ends or the bodies respectively are illuminated when they are rotated to different angular positions about their longitudinal axis. For different angular positions during the rotation, the difference between light intensity of light which has passed through the body or the end and in its position corresponds to the central portion of the body extending in the longitudinal direction, and of light which has passed through the body and the fiber end and in its position corresponds to the region located most close to and outside the central portion.

The angular offset or the angular position in relation to each other between axial asymmetries in two cylindrical bodies, which are located in some start angular positions opposite each other with their longitudinal axes aligned, is for instance, when the two bodies have optically identical structure, the angle through which one of the bodies has to rotated from its start position about the common longitudinal axis to make the end surface of this body have the same angular position as the other body, that is the structures of the bodies or the internal configurations, in particular in regard of their optical properties, of the bodies are then also aligned. When the structures of the bodies are not optically identical but similar, the angular position to which one of the bodies has to be rotated, is the position which gives the best agreement or coincidence of the optical structure in this body with the other one.

The light intensities are determined in a region close to or within the area where a mapping or picture of the light source is obtained. When a conventional optical fiber is hit by light its main part, the cladding, acts as a cylindrical lens and focuses the light to a focal line whereby a picture is obtained of the fiber near the focal line. In the determination, then, the light intensities close to this focal line are used, i.e. taken along some line essentially perpendicular thereto and thus to the longitudinal direction of the fiber. The line should also form a not too small angle, i.e. larger than 30°, to the central line of the illuminating light or to a line from the light source to the fiber.

The determined differences taken as functions of the rotational angle form curves for the bodies and for the ends respectively. The curves are compared and are parallel translated to a new angular position where a maximal agreement of the shapes of the curves is obtained. The angle between the curves in this angular position gives the relative angular position about the central axes of the bodies or fiber ends respectively between the axial asymmetries, in particular between optically inhomogeneous or interfering regions, i.e. in the first special case between the polarization axes or between the stress concentration zones of two ends of optical PM-fibers, and in the second special case the planes through the two cores of the ends of the optical twin-core fibers, in the start positions of the bodies or ends respectively. In splicing two PM-fibers or two twin-core fibers the angle determined in that way is used in order to rotate the ends of the fibers so that the polarization axes or the stress concentration zones or the planes through the two cores respectively in the fiber ends will be aligned with each other or generally with a rotational or angular displacement of the fiber ends before the splicing so that the axial asymmetries, in particular the optically inhomogeneous regions in the two fiber ends will be aligned with each other.

In the determination of the angular offset of the optically interfering regions about the longitudinal axis, in the special cases between the polarization axes or the planes through the twin-cores of two fiber ends, which are placed in arbitrary angular start positions, of optical PM-fibers or twin-core fibers respectively, the bodies or fiber ends are illuminated with a light beam, e.g. a substantially parallel light beam, from a light source provided with suitable optical devices, in particular essentially perpendicularly to the longitudinal direction of the bodies or fiber ends respectively. In the fiber case the end surfaces can be located, as for splicing by means of fusion welding, close to or substantially abutting each other with the longitudinal axes of the fiber ends essentially aligned with each other or at least very well parallel to each other. The illumination is then provided advantageously by means of a single suitably placed light source.

The bodies or ends respectively of each one of the two fibers are then rotated a suitable total angular interval from their start angular position about their longitudinal axis. The least usable total angular interval depends on the rotational symmetry of the bodies or fibers respectively. If the rotational symmetry is two-fold or binary, i.e. if for instance the cross section of a body when rotated a half turn coincides with the cross section in the start position, the angular interval is at least half of a full turn.

For PM-fibers, the offset of which is to be determined, each one should, in the ideal case, be symmetric about its longitudinal axis and then the measured difference values will be periodically repeated having a period of 180°, half a full turn. Such a symmetry, however, does not most often exist owing to the complicated fabrication process for PM-fibers. Therefore advantageously determinations of the differences, also called heights, are made for angular positions over a full turn.

A dual symmetry may sometimes be found for instance for fibers having two cores. Generally, however, the symmetry is not perfect and then, also in this case, it is suitable having an angular interval of a full turn.

During the rotation, for different, spaced apart angular positions, the difference between the light intensity of light, which has passed through the fiber end and in its position corresponds to the central portion of the fiber, and of light which has passed through the fiber end and in its position corresponds to the region located most close to and outside the central portion of a fiber, is determined. Determinations of the difference, also called heights, are advantageously made over angular positions evenly distributed over the total angular interval used.

The determined differences for one body or fiber end respectively are then compared to the differences for the other body or fiber end respectively. From this comparison the angular offset is determined from the angular position for one of the bodies or fiber ends in relation to its start angular position which, if it would have been the angular start position of this body or its fiber end, would have given the best agreement between the determined differences for this body/fiber end and the differences for the other body/fiber end. The desired angular offset can then be determined as the angle corresponding to this angular position. For the case that the bodies are of different kinds or the fiber ends belong to optical fibers of different kinds a constant value must be added to the angle corresponding to the determined angular position which value is specific to the pair of bodies or pair of optical fibers respectively for which the determination has been performed.

In the determination of the differences for different angular positions for a body/end for each angular position a light intensity curve is determined along a straight line essentially perpendicular to the longitudinal axis of the body/fiber end, after which this curve is evaluated for determination of the difference of the central portion of the curve and the regions located most close to the central portion of the curve. For each angular position, in addition, light intensity curves can be determined along several such straight lines spaced from each other. In the determination of the difference for a considered angular position then the average is used of the differences determined from the curves determined for this angular position.

The agreement between the differences $p_1, p_2, \ldots p_N$ for one of the fiber ends and the differences $q_1, q_2, \ldots, q_N$ for the other one of the fiber ends is in an advantageous way determined by means of a correlation function C according to $$C = \frac{\left( N \sum_{i=1}^{N} p_i q_i - \sum_{i=1}^{N} p_i \sum_{i=1}^{N} q_i \right)^2}{\left[ N \sum_{i=1}^{N} p_i^2 - \left( \sum_{i=1}^{N} p_i \right)^2 \right] \cdot \left[ N \sum_{i=1}^{N} q_i^2 - \left( \sum_{i=1}^{N} q_i \right)^2 \right]}$$

where a C high value means a good agreement.

Most often the differences can only be determined for a limited number of rotational angles and then, in order to evaluate the agreement more accurately, an interpolation function can be calculated for the determined difference values for a body/fiber end as a function of the angular rotation. From the interpolation function further interpolated different values can be determined for the comparisons to the difference values for the other body/fiber end.

In the particular case of ends of optical fibers, especially optical PM-fibers or twin-core fibers, the determination of the angular offset about the longitudinal axis of the fiber ends between the planes through the optically interfering regions or through the stress zones or the two cores of the ends of two optical PM-fibers or twin-core fibers respectively can be used for splicing the fibers to give good splices. Then the end surfaces of the optical fibers are placed close to or essentially at or abutting each other and opposite to each other with the longitudinal axes of the fibers essentially aligned with each other or at least essentially parallel to each other. Then the ends of the fibers are rotated about their longitudinal axes to take an angular position in relation to each other so that an angular alignment between the interfering regions, in particular between the polarization axes or the planes through the stress zones or the double cores, in each fiber end is obtained. Finally the fiber ends are rigidly secured or fixed, attached to each other or clamped, in this position in relation to each other in some suitable way, in particular by fusion welding. The rotation of the end of one of the fibers in relation to the end of the other fiber should then be made with an angular amount corresponding to the angular offset determined before the rotation.

DESCRIPTION OF THE FIGURES

An embodiment of the invention which is given for illustrative but not limiting purposes, will now be described with reference to the accompanying drawings in which FIGS. 1a and 1b schematically show an optical PM-fiber illuminated from a light source for two different orientations of the stress concentration zones of the fiber in relation to the direction of the arriving light rays.

FIG. 8b shows the cross-section of the fiber, the intensity curve of which is shown in FIG. 8a, FIGS. 9a and 9b, 10a and 10b, 11a and 11b show the same as FIGS. 8a and 8b respectively for other special types of PM-fibers.

DETAILED DESCRIPTION

Hereinafter the invention will be described in connection with alignment and connection of ends of optical PM-fibers and twin-core fibers.

Figure 1A:
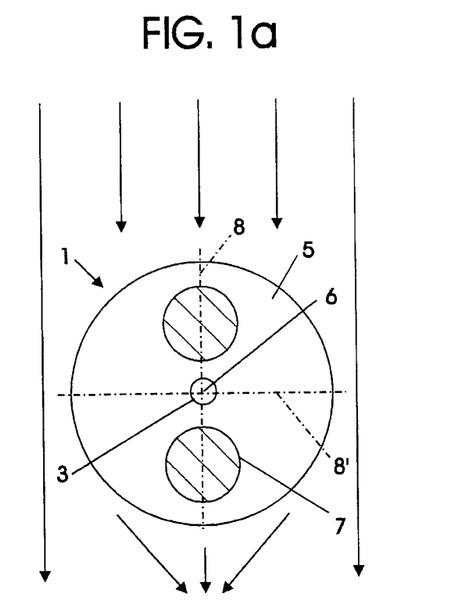
Figure 1B:
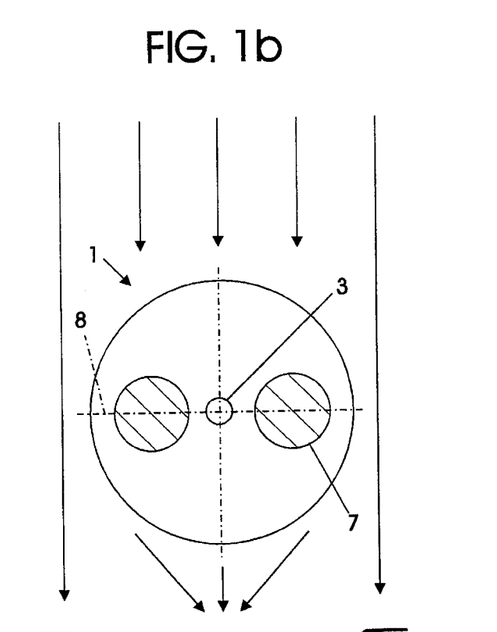

In FIGS. 1a and 1b the light path is schematically illustrated for the travel of a flat light beam (arriving from the top as seen in FIGS. 1a, 1b) through an optical PM-fiber 1 having a conventional core 3 and two stress concentration zones 7, as rotated in two different orientations around its longitudinal axis 6. The optical fiber 1 has also a cladding 5 having an essentially exterior circular-cylindrical surface surrounding the core 3 and the stress zones 7. The zones 7 are located at two places in relation to the longitudinal axis of the fiber which are located more or less exactly diametrically opposite to each other, as seen in a cross sectional view of the fiber.

Light which is transferred through a PM-fiber 1 can have two polarization modes perpendicular to each other. These two modes have their magnetic and electric field vectors located in symmetry planes in the fiber 1 and more specifically along either one of two polarization axes 8, 8', of which one, 8, as seen in the cross section through the fiber 1, passes centrally through the stress concentration zones 7 and the other polarization plane 8' extends perpendicularly to the first one. Ideally, these planes 8, 8' also pass through the center line 6 of the fiber 1, i.e. through the center of the core 3. In a connection of two ends of optical PM-fibers then naturally the polarization axes or the stress zones of the fiber ends are to be aligned with each other to allow a good transmission of light from one end to the other. Cross sections of various types of PM-fibers are illustrated in FIGS. 8b, 9b, 10b and 11b.

Figure 1C:
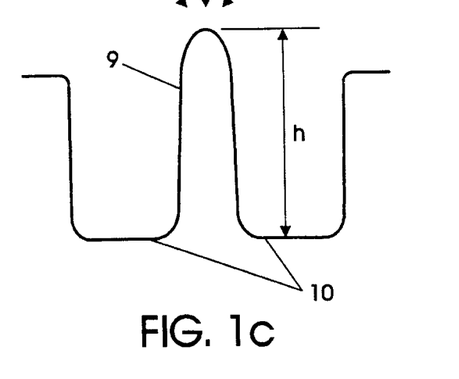
FIGS. 1c and 1d show the resulting light intensity after the travel of the light through the fiber oriented as in FIGS. 1a and 1b respectively, FIGS. 2a and 2b schematically show the same as FIGS. 1a and 1b for an optical twin-core fiber for two different orientations of the cores of the fiber.
Figure 1D:
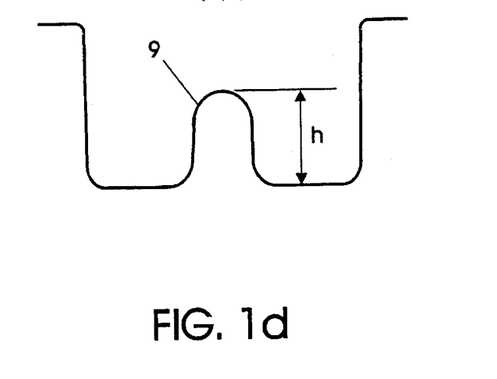

Below FIGS. 1a and 1b, in FIGS. 1c and 1d respectively, the intensity of light is illustrated which has passed through the fiber where the intensity curve is taken along a direction perpendicular to both the arriving parallel light beam and perpendicular to the longitudinal axis 6 of the optical PM-fiber. The curve is further determined along a line which extends approximately through the focal line of the lens which is formed by the cladding 5 of the fiber 1. In FIG. 1a an orientation of an optical fiber 1 is shown for which the stress concentration zones 7 are placed so that they both are aligned with and are symmetrically located in relation to the direction of the arriving light beam. Light rays which arrive against the stress concentration zones 7 do not significantly add to the light intensity which can be observed at the other side of the fiber 1, i.e. after the travel of the light beams through the fiber 1. Deflection of the light beams take place at the travel thereof into and out of these regions and at reflections at the surface of the stress zones. Since in this case the light rays can pass unobstructedly through the exterior cladding portions of the optical fiber and further, a cylindrical body as has been mentioned above, has a focusing effect on arriving parallel light rays, which is called the lens effect of the optical fiber, a significant light intensity is obtained at the corresponding focus what in the light intensity curve is shown as a rather high central peak 9.

In FIG. 1b the orientation of the optical PM-fiber is instead such that the two stress concentrations zones 7 are essentially located along a diameter of the optical fiber 1 which diameter is perpendicular to the direction of the arriving parallel light beam. As is apparent from FIG. 1b, in this case a large portion of the arriving light rays is inhibited to pass through the optical fiber 1 owing to the interfering effect of the stress concentration zones 7. The remaining light rays which pass through the optical fiber 1, as if is this was a cylindrical body, are otherwise focused in the usual way according to the lens effect. A light intensity curve as illustrated in FIG. 1c below FIG. 1b then has a central peak 9 which has a significantly lower height in this case compared to the curve in FIG. 1c below FIG. 1a.

Figure 2A:
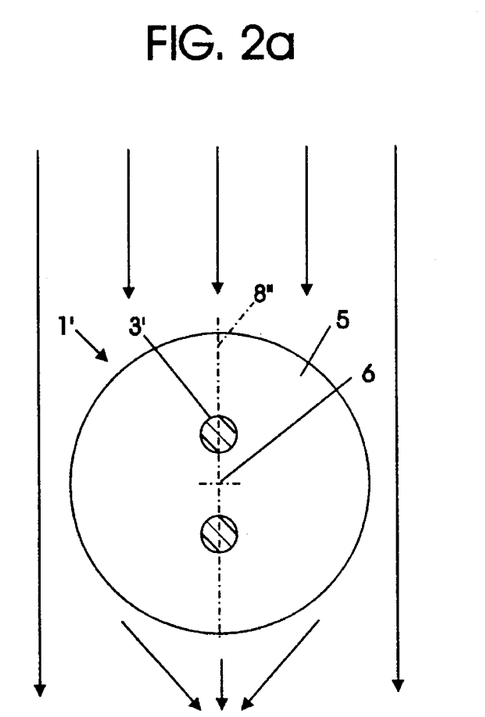
Figure 2B:
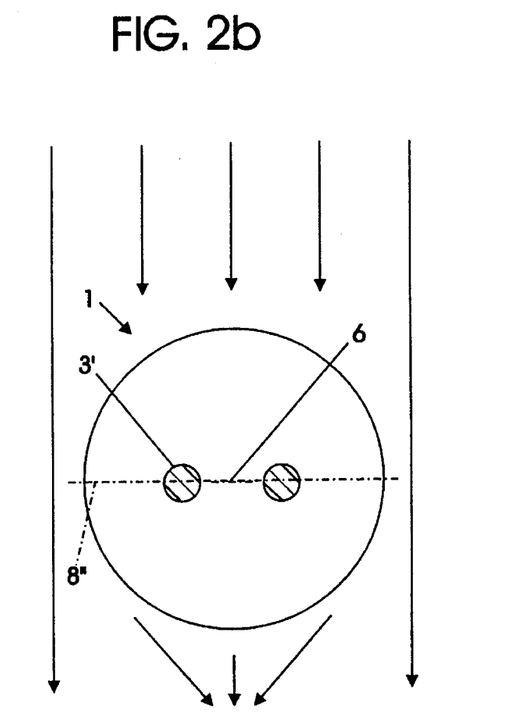
Figure 2C:
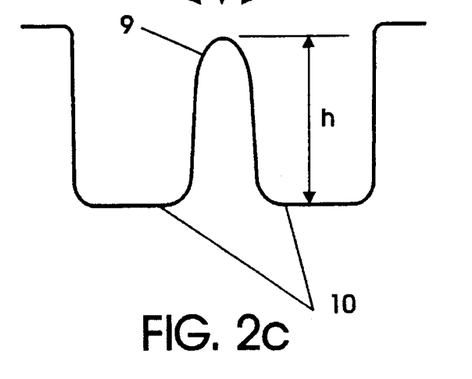
FIGS. 2c and 2d show the resulting light intensity after the travel of the light through the twin-core fiber oriented as in FIGS. 2a and 2b respectively, FIG. 3 schematically shows the light paths and electrodes in a splicing device for optical fibers, FIG. 4 schematically, partly in block diagram form, shows a device for splicing optical fibers.
Figure 2D:
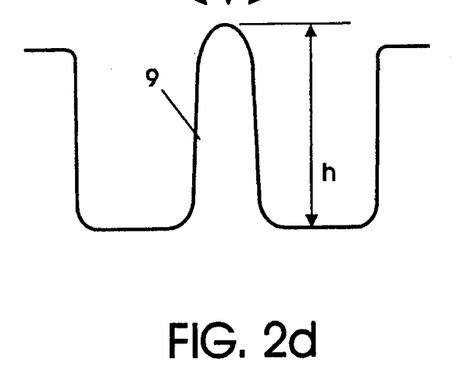

In FIGS. 2a and 2b, in the corresponding way, the light path is schematically illustrated for the travel of a light beam through an optical twin-core fiber 1' having two cores 3', as rotated in two different orientations around its longitudinal central axis 6, in FIG. 2a with the plane 8" through the cores 3 aligned with the direction of the incoming light and in FIG. 2b with the plane 8" perpendicular thereto. In this case, the effect of the optically interfering regions, that is of the cores 3', on the light passing through the fiber 1' is less pronounced. Also, the relation of central light intensities in the two orientations is reversed, so that, as illustrated by the intensity curves in FIGS. 2c and 2d, a larger central light intensity is obtained for the orientation of FIG. 2b with the plane 8" through the cores 3' perpendicular to the incoming light rays than that obtained when the plane 8" through the cores 3' is parallel thereto as in FIG. 2a.

When connecting two twin-core fibers, for achieving a maximum transmission of light from one fiber core in a fiber end to the corresponding fiber core in the other fiber end in a splice or joint, the end surfaces of the cores in the two fiber ends which are to be spliced, must be placed opposite to each other.

Figure 5:
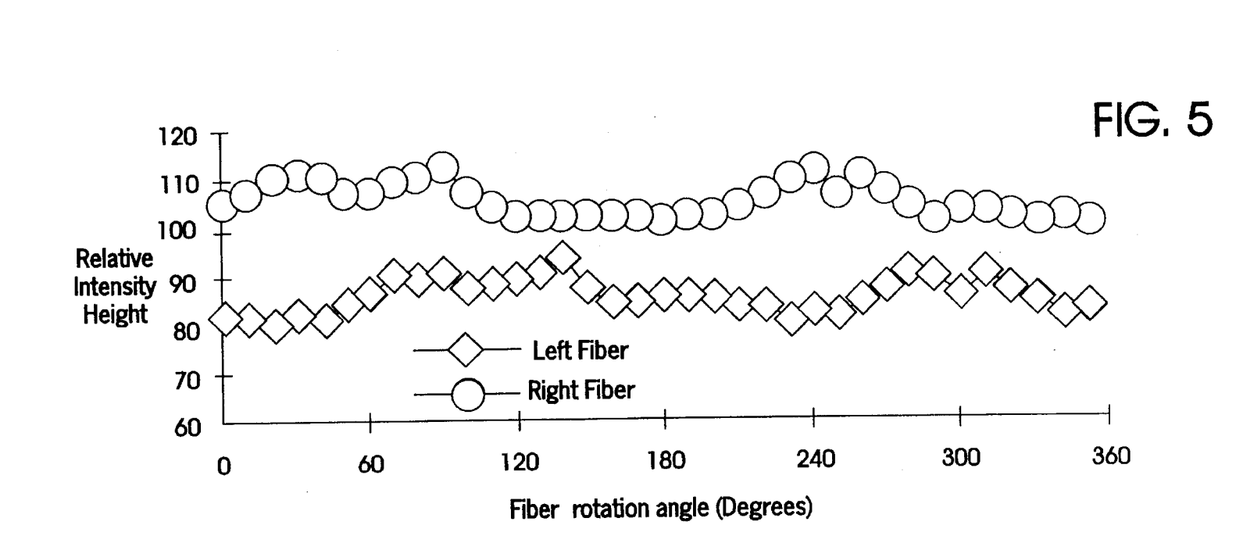
FIG. 5 shows a diagram of relative central light intensity as a function of the rotational angle for two PM-fiber ends.

In a continuous rotation of the optical fiber 1, 1' about its longitudinal axis 6 curves of the type, which are illustrated in FIGS. 1c, 1d and 2c, 2d respectively and in which the central intensity peak 9 has values which are located between the intensity values of the curves shown in these Figures, are obtained. In these curves, for rotations of the fiber 1, 1' to different angular positions, a value h is determined which is the difference between the height of the central peak 9 and the directly surrounding portions 10 of the light intensity curve. This value h is determined for different angular positions of the optical fiber 1, 1', for instance for each tenth degree. The determined heights are plotted in the diagram in FIG. 5 for two individual PM-fibers, in this case for two fiber ends which are to be spliced, a left fiber end and a right fiber end. For fibers of the same kind their height profiles, as is illustrated in FIG. 5, should have principally the same shape and with a suitable translation of the profile curves, they can be made to coincide or agree in the best way. The angular translation value obtained thereby will then be the angular offset between the fiber ends in their start positions.

For a numerical evaluation of the agreement the determined values of h can be written as vectors P and Q respectively:

$$P = \{p_1, p_2, p_3, \ldots, p_{36}\} \quad (1)$$

$$Q = \{q_1, q_2, q_3, \ldots, q_{36}\} \quad (2)$$

where $p_1, q_1$ are values for the angular position 0°, $p_2, q_2$ are values for the angular position 10°, etc.

A correlational function is then defined in the following way:

$$C(k,N,X,Y) = \frac{\left(\frac{N}{2}\sum_{i=N/4}^{3N/4-1} x_{i+k}y_i - \sum_{i=N/4}^{3N/4-1} x_{i+k} \sum_{i=N/4}^{3N/4-1} y_i\right)^2}{\left[\frac{N}{2}\sum_{i=N/4}^{3N/4-1} x_{i+k}^2 - \left(\sum_{i=N/4}^{3N/4-1} x_{i+k}\right)^2\right] \cdot \left[\frac{N}{2}\sum_{i=N/4}^{3N/4-1} y_i^2 - \left(\sum_{i=N/4}^{3N/4-1} y_i\right)^2\right]} \quad (3)$$

where the vectors X and Y are defined as $$X = \{x_1, x_2, x_3, \ldots, x_N\} \quad (4)$$

$$Y = \{Y_1, Y_2, Y_3, \ldots, Y_N\} \quad (5)$$

N is the number of considered equidistant measurement points and it is assumed to be dividable by 4, so that for for instance the vectors P, Q it is valid that N=36, and K is the index value where the points start in the vector X in the calculation of the correlation. The index value k is an integer in the interval $-N/4 \leq k < N/4$ and it then corresponds also to an angular value. The correlation is calculated according to the formula (3) for a number of points which correspond to half the total number N of measurement points and thus corresponding to a rotation of a half full term of the fibers. More specifically, the correlation is calculated for N=36 between the measurement points $x_{k+9}, x_{k+10}, \ldots, x_{k+23}$ and $y_9, y_{10}, \ldots, y_{23}$, or for instance measurement points at the rotational angles (−90°+k·10°), (−80°+k·10°), (−70°+·10°), . . . , (70°+k·10°), (80°+k·10°) for one of the fibers and at the rotational angles −90°, −80°, −70°, . . . , 70°, 80° for the other one of the fibers The start index k here runs through the integers from and including −9 to and including 8 and thus corresponds to angular positions in the X vector −90°, −80°, . . . , 80°. Correlation values C calculated in this way for two fiber ends (set X=P, Y=Q) are plotted in the diagram in FIG. 6. From this Figure it appears that a correlation maximum is obtained approximately at 50° or k=4.

Figure 6:
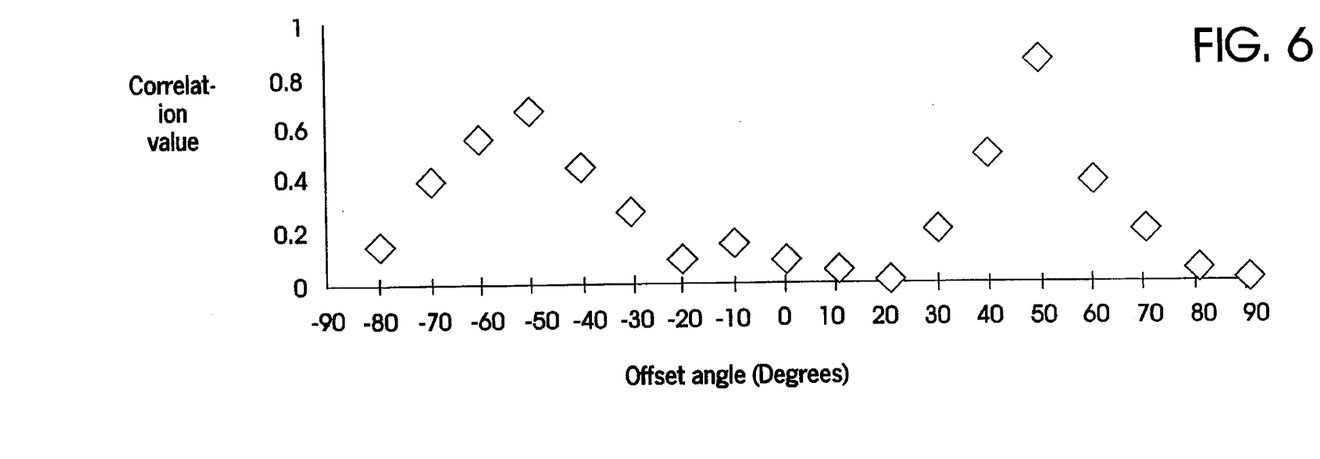
FIG. 6 shows a diagram over correlation values as a function of the offset angle for the fiber ends of FIG. 5.

By means of the correlation function (3) it is thus possible to compare an h-profile vector P to another h-profile vector Q to find the value, that is the summation interval for the vector P, where the maximum correlation can be obtained between the two h-profiles, see FIG. 6. If for instance K is the point, where the maximum correlation exists, so that thus $$\text{Max}\{C(k,N,P,Q), k \in [-N/4,+N/4]\} = C(K,N,P,Q) \quad (6)$$

the angular displacement or offset about the longitudinal axes of the fibers between the planes through the stress zones of the fibers or generally between axial asymmetries of two identical fibers, in particular between an optical inhomogeneity in each one of the fiber, at the rotation thereof about their longitudinal axes of the kind illustrated in FIGS. 1a, 1b, 2a, 2b, roughly be determined as $$\alpha = 10(K-N/4)(\text{degrees}) \quad (7)$$

where the number 10 is a scale factor which means that the measurement points are situated at each tenth degree. The equation (3) gives the translation or offset α with an accuracy less than or better than ±9°.

Within such a determined area of ±9° then a smooth profile curve for the quantity h for each fiber end can be determined by means of a curve fitting method, e.g. by means of interpolation with cubic fitting ("cubic spline"). The function determined in that way for one of the fiber ends can for numerical calculations be set up as a vector such as above $$P = \{p_1, p_2, p_3, \ldots, p_N\} \quad (8)$$

with components equal to the interpolated h-values in e.g. N=36 points deviating from the angle α with −17°, −16°, −15°, . . . , 17°, 18°. In the corresponding way a vector Q for the other one of the fiber ends is set up as above $$Q = \{q_1, q_2, q_3, \ldots, q_N\} \quad (9)$$

having components equal to the interpolated h-values in N points, e.g. at angular values −17°, −16°, −15°, . . . , 17°, 18° as above.

The correlation function (3) is used again to determine the correlation between the interpolated values according to (8) or (9) for different values of the start index k, which in the example according to the above corresponds to the angular deviations −8°, −7°, −6°, . . . , 8°, 9° from the rotational angle α. Then it is determined again as above the start index K and the corresponding angular deviation α which is a maximum correlation, i.e. so that $$\text{Max}\{C(k,N,P_\alpha,Q), k \in [-N/4,+N/4]\} = C(K,N,P_\alpha,Q) \quad (10)$$

Figure 7:
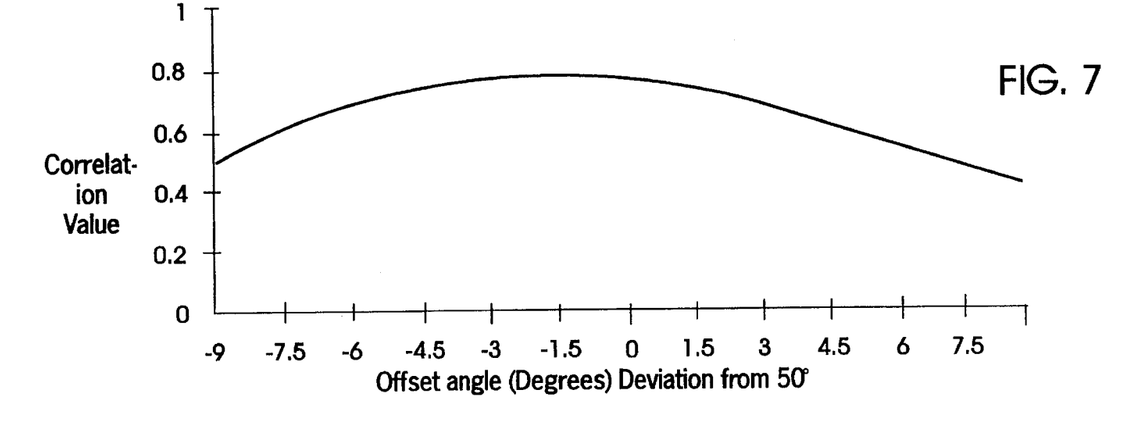
FIG. 7 shows a diagram similar to that in FIG. 6 but for a smaller angular interval.

A curve plotted for the correlation values which have been determined by means of the interpolated values for the h-profiles of FIG. 5, are illustrated in FIG. 7 for the angular interval (α−9°, α+9°), α=50°. The maximum of the curve in FIG. 7 is here located at Θ=−2.7°.

The finally determined angular offset $\alpha_{final}$ between the ends of the two fibers can then be determined as $$\alpha_{final} = \alpha + \Theta \quad (11)$$

In the example illustrated in FIGS. 5–7 thus the angular offset between the positions of the stress zones 7 or the planes passing therethrough in the two optical PM-fibers is equal to $\alpha_{final} = 50 - 2.7 = 47.3°$. It means that if the h-profile of the right fiber, which appears from the filled circles of FIG. 5, is translated through an angle $\alpha_{final} = -47.3°$ (the angle 47.3° in the direction to the right hand as viewed in the Figure), the largest value of the correlation will be obtained and the best agreement between the measured h-values. It corresponds to a rotation of the right fiber through the same angle 47.3° to one side.

In each calculation of the correlation value C by means of the formula (3), to preliminary determine a smaller angular interval, where a more accurate calculation is made, as has been described above with reference to the formulae (8)–(10), only values are used which are determined for an angular interval of 180°. It will in many cases give a sufficient accuracy. The limits chosen for the index i in the summation, however, corresponds only to an angular offset therebetween of at most ±90°, which can be sufficient if the fibers have a corresponding rotational symmetry, i.e. if as seen in a cross section it coincides with itself in a rotation of 180°, i.e. a double or two-fold rotational symmetry. In fibers which do not satisfy this criterion the summation intervals must be extended, so that correlation values corresponding to rotations of ±180° can be calculated.

Therefore the vectors P and Q are cyclically expanded:

$$P' = \{p_1, p_2, p_3, \ldots, p_{36}, p_{37}, p_{38}, p_{39}, \ldots, p_{72}\} \quad (1')$$

$$Q' = \{q_1, q_2, q_3, \ldots, q_{36}, q_{37}, q_{38}, q_{39}, \ldots, q_{72}\} \quad (2')$$

where $p_1 = p_{37}$, $q_1 = q_{37}$ are values at the angular position 0°, $p_2 = p_{38}$, $q_2 = q_{38}$ are values at the angular position 10° for a rotation from the start position, etc.

A slightly modified correlation function C' will then look like $$C'(k,36,P',Q') = \frac{\left(36 \sum_{i=1}^{36} p_{i+k} q_i - \sum_{i=1}^{36} p_{i+k} \sum_{i=1}^{36} q_i\right)^2}{\left[36 \sum_{i=1}^{36} p_{i+k}^2 - \left(\sum_{i=1}^{36} p_{i+k}\right)^2\right] \cdot \left[36 \sum_{i=1}^{36} q_i^2 - \left(\sum_{i=1}^{36} q_i\right)^2\right]} \quad (3')$$

Here k=1 corresponds to an angular offset therebetween of 10°, k=2 an offset of 20°, etc up to k=36, which corresponds to an angular offset or displacement therebetween of 360°. As above the value of k is determined for which the correlation function C' will have a maximal value and this gives a first rough value of the angular offset. Then the finer determination is performed by means of the interpolation method according to the above.

Figure 8A:
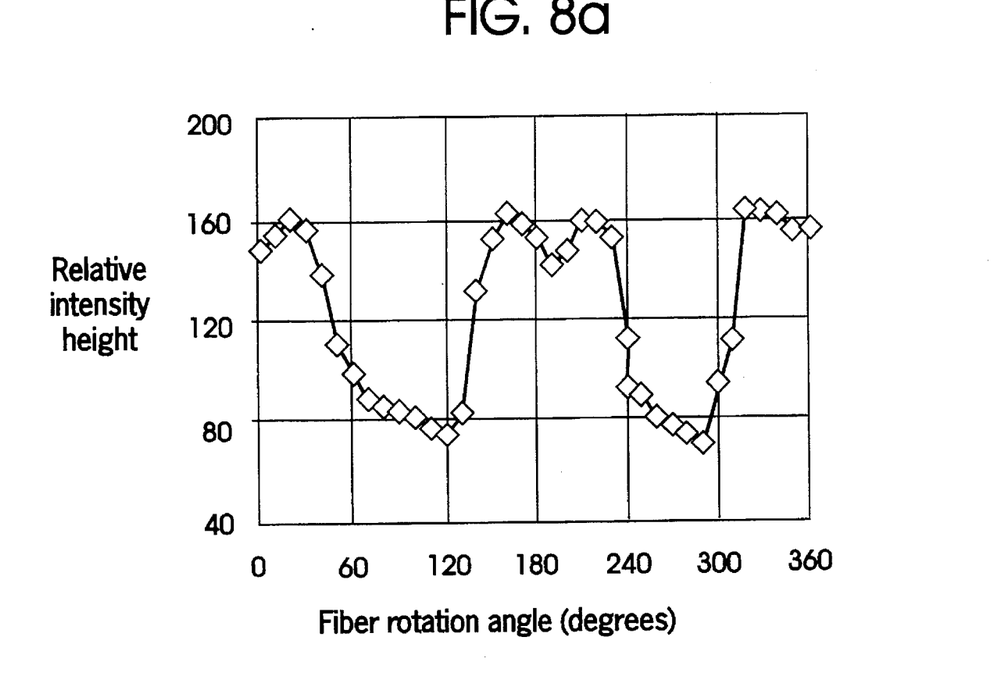
FIG. 8a shows a diagram of the relative central light intensity as a function of the rotational angel for a special type PM-fiber.
Figure 9A:
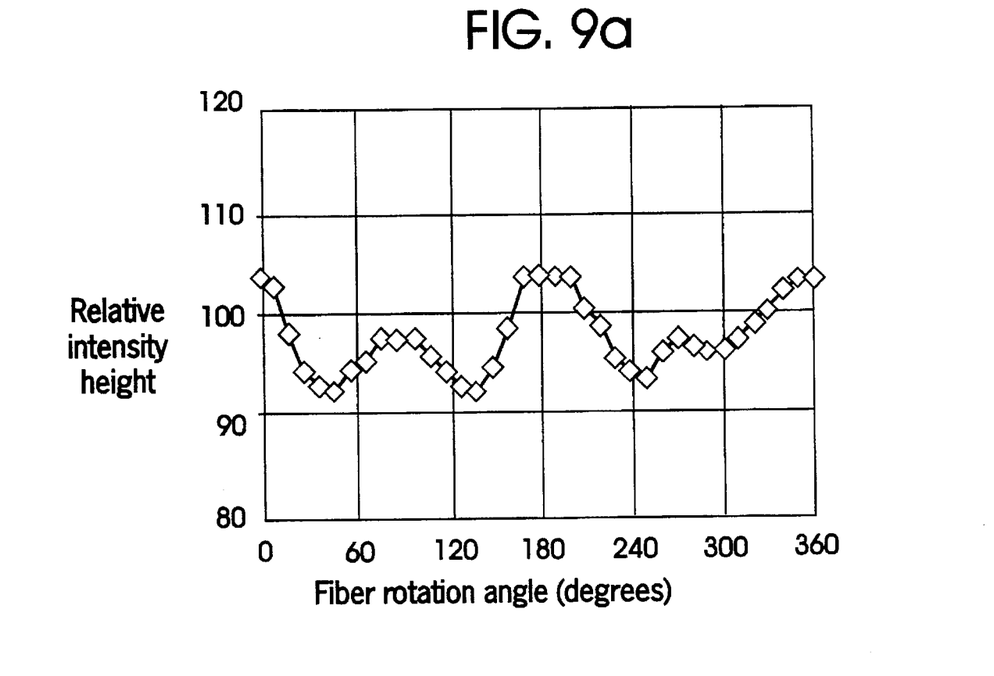
Figure 10A:
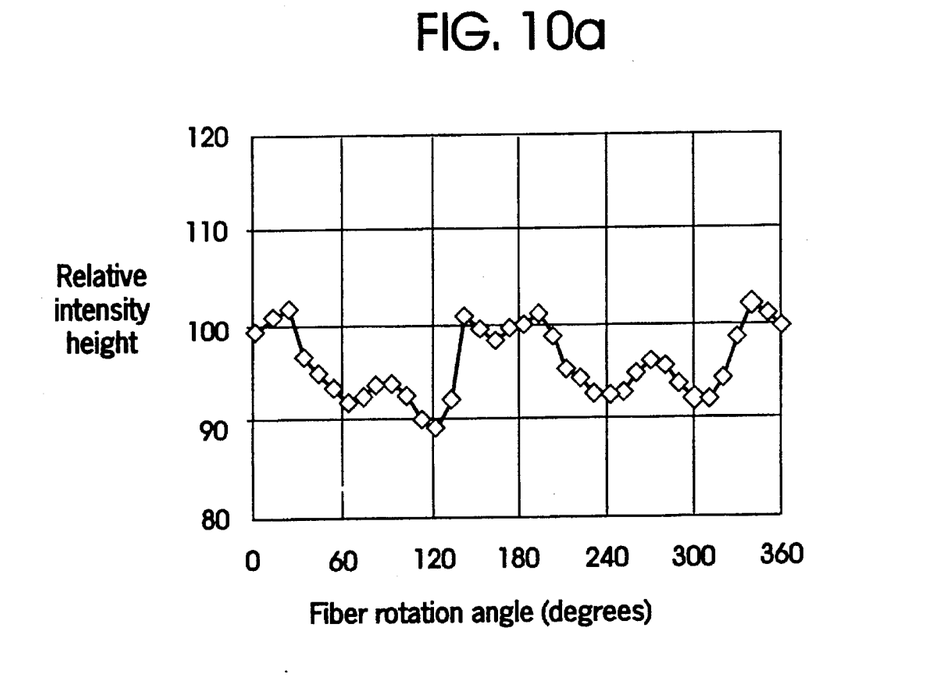
Figure 10B:
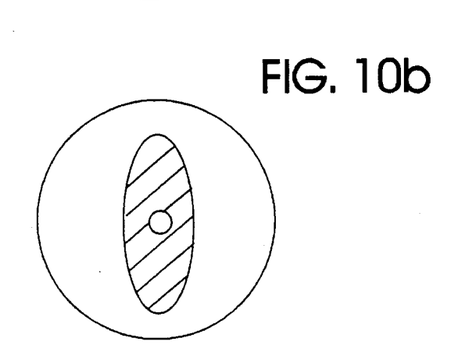
Figure 11A:
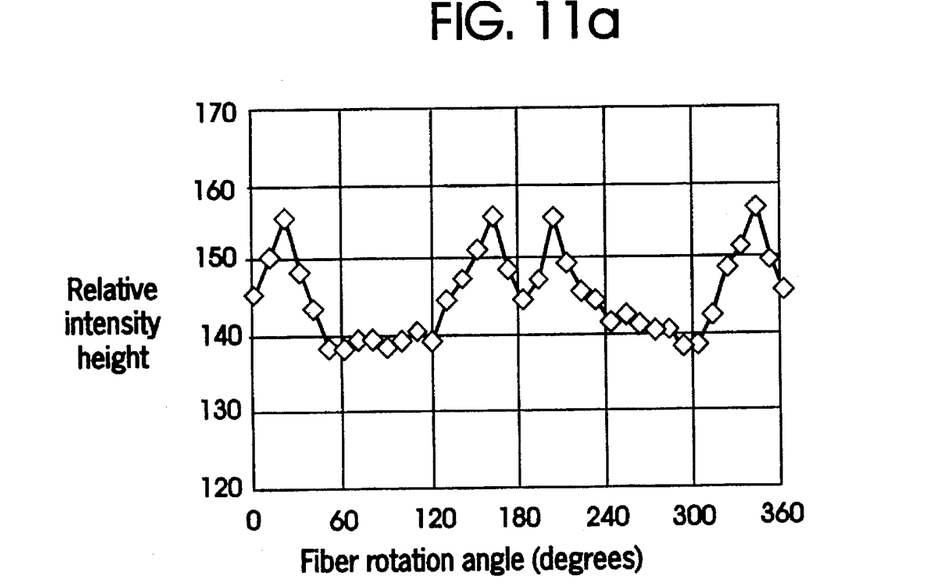
Figure 11B:
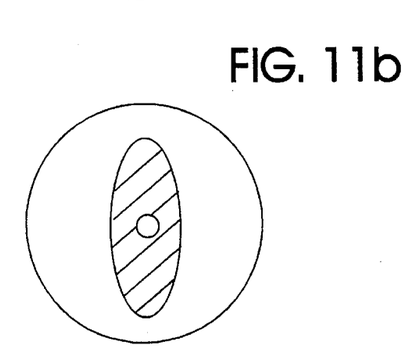

The measurement values illustrated in FIG. 5 are related to fiber ends of PM-fibers of the same kind. Different fiber types, however, have different h-profiles and examples thereof are illustrated in the diagrams in FIGS. 8a–11b. Thus the profile for a "York Bowtie" PM-fiber having a diameter of 125 μm is illustrated in FIG. 8a, the cross-section thereof being illustrated in FIG. 8b. This fiber type has two main stress zones approximately having the shape of circular annular segments. In FIG. 9a the h-profile is illustrated for a "Panda" PM-fiber of diameter 125 μm having basically the same cross-section as the PM-fibers illustrated in FIGS. 1a, 1b, 2a and 2b. In FIGS. 10a and 11a the h-profiles are illustrated for "3M" PM-fibers of diameters 80 and 125 μm respectively, these fibers having an elliptical region in the cladding as viewed in the cross-section.

In carrying out the method described above in order to find the best agreement and the largest correlation for fiber ends of fibers of different kinds the hereby determined angle $\alpha_{final}$ will not necessarily be the angular offset between the stress concentration zones, as taken for the centres thereof in relation to the longitudinal axis of the respective fiber, or more generally between the polarization axes. However, it appears that by an addition of a constant angle $\Delta_{fiber1, fiber2}$, which is particular for a considered pair of optical PM-fiber types, the correct angular offset is obtained. The constant additional angle can be determined by an active measurement of the extinction ratio for light passing through a splice or by an observation in a microscope of the end surfaces of the fiber ends. As suggested by the diagrams of FIGS. 8a–11b such an additional value may typically have the value of +90° or −90°.

When the angular offset $\alpha_{final}$ between the positions of the stress concentration zones or the polarization axes of two PM-fibers is known, further, the extinction ratio R can be calculated from $$R = 10 \log (\tan^2 \alpha_{final}) \text{ (dB)} \quad (12)$$

according to e.g. IEEE J. Lightwave Technology, Vol. LT-5, 1987, p. 910. For an angular offset $\alpha_{final} = -1.5°$ the corresponding extinction ratio R is then calculated as −31.6 dB. Practically, the extinction ratio can be determined in a splice between two PM-fibers by rotating the spliced fiber, as has been described above for each fiber end, to different angular positions, determining the light intensity curves for places in the spliced fiber on both sides of the splice, calculating the height profiles and using the correlation function for determining the offset angle in the finished fiber splice. Then the ratio can be calculated from formula (12).

Figure 12:
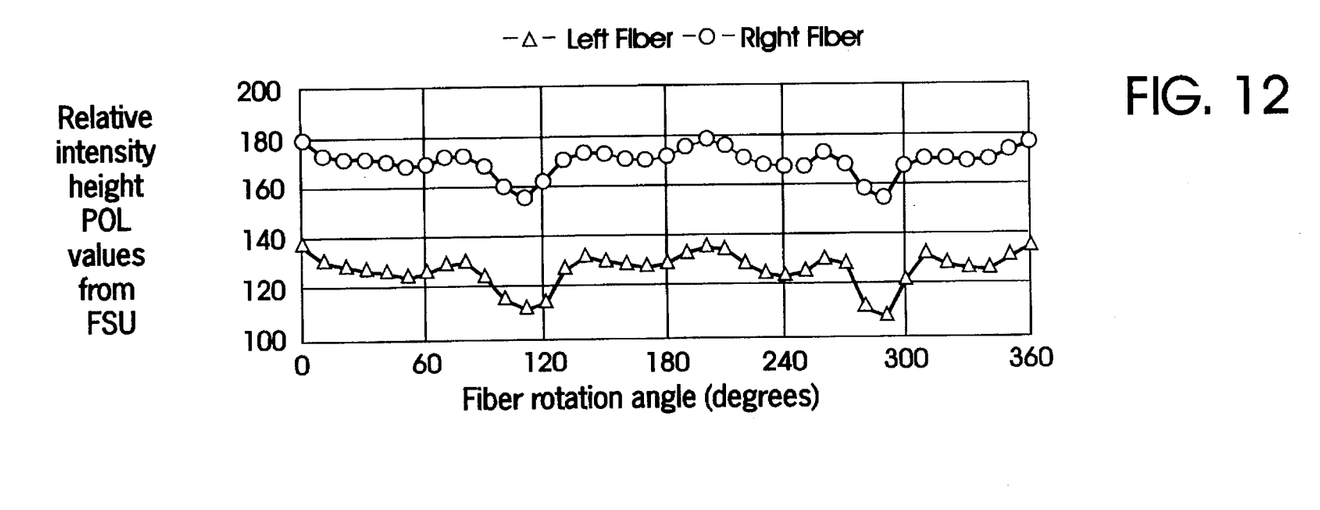
FIG. 12 shows a diagram of relative central light intensity as a function of the rotational angle for two ends of optical twin-core fibers.
Figure 13:
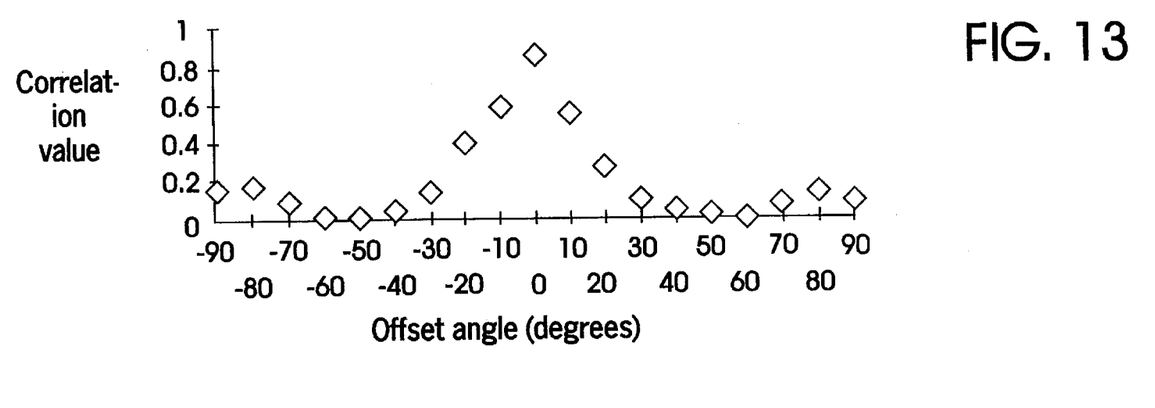
FIG. 13 shows a diagram over correlation values as a function of the offset angle for the fiber ends of FIG. 12.
Figure 14:
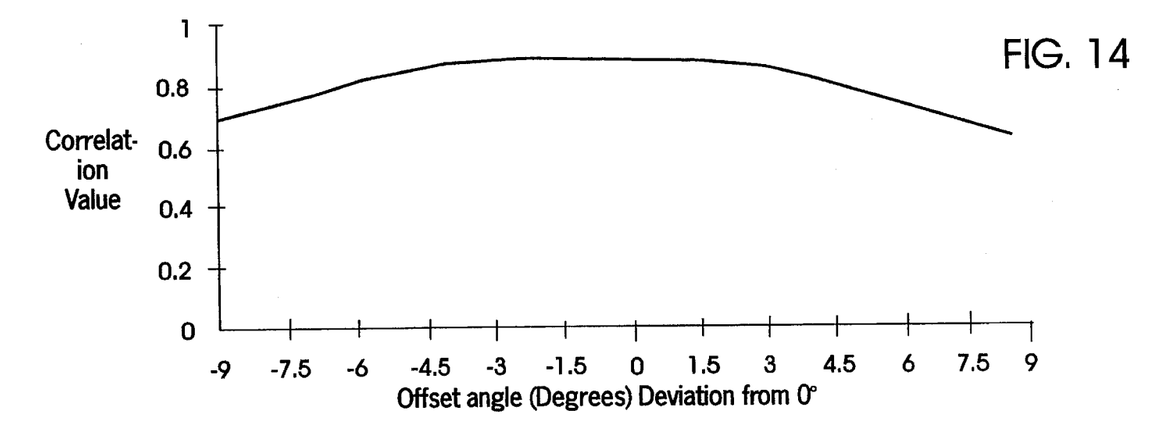
FIG. 14 shows a diagram similar to that in FIG. 13 but for a smaller angular interval.

In FIGS. 12–14 the measured and calculated values, corresponding to the diagrams of FIGS. 5–7, are shown for two fiber ends of twin-core fibers. The rough calculation gives a correlation maximum at $\alpha = 0°$ or k=0. The interpolation procedure gives an angular increment of $\Theta = -1.0°$ and a resulting, total angular offset $\alpha_{final} = 0 - 1.0 = -1.0°$.

The method described above for determination of the angular offset about the longitudinal axis between two ends of two identical optical fibers can be performed in common processor controlled splicing devices for optical fibers and it can be used therein to achieve in a simple way a splicing of such fibers having splices in which optical interfering regions in a fiber end are essentially aligned with the corresponding optical interfering regions in another fiber end and in which in the special cases thus the polarization axes or the stress concentration zones in PM-fibers or two cores in twin-core fibers are essentially aligned with and located at and against each other.

Figures 3, 8B, 9B:
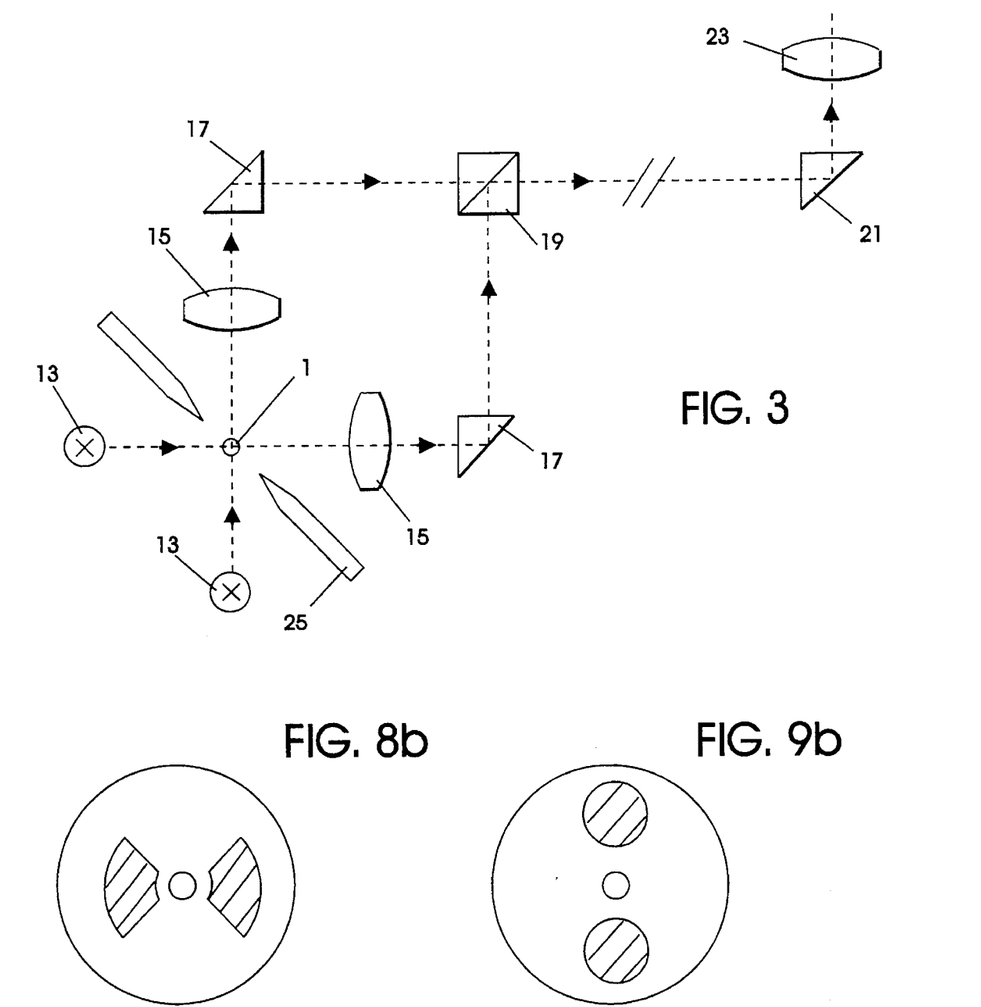

Some essential details of a commercially available splicing device for optical fibers of standard type are illustrated in FIG. 3. Two light sources 13 are arranged so that they issue light beams which hit the optical fiber 1 in directions which are perpendicular to each other. The light beams through the fibers pass optical lenses 15 of standard quality, are deflected by means of prisms 17 and are collected to a single parallel light beam by means of a beam splitter 19. The single parallel light beam thus accomplished is deflected further in a prism 21 and is mapped or reproduced by means of a lens 23 on the light sensitive elements in a video camera, not shown. The lens 23 can be included in this video camera. By means of this optical system thus an optical fiber can be viewed in two perpendicular directions. The two light sources are hereby activated alternatingly with each other. In splicing two optical fibers an electric arc is generated between two electrodes 25 which are located so that the arc hits the end surfaces of the two fibers and melts the ends together.

Figure 4:
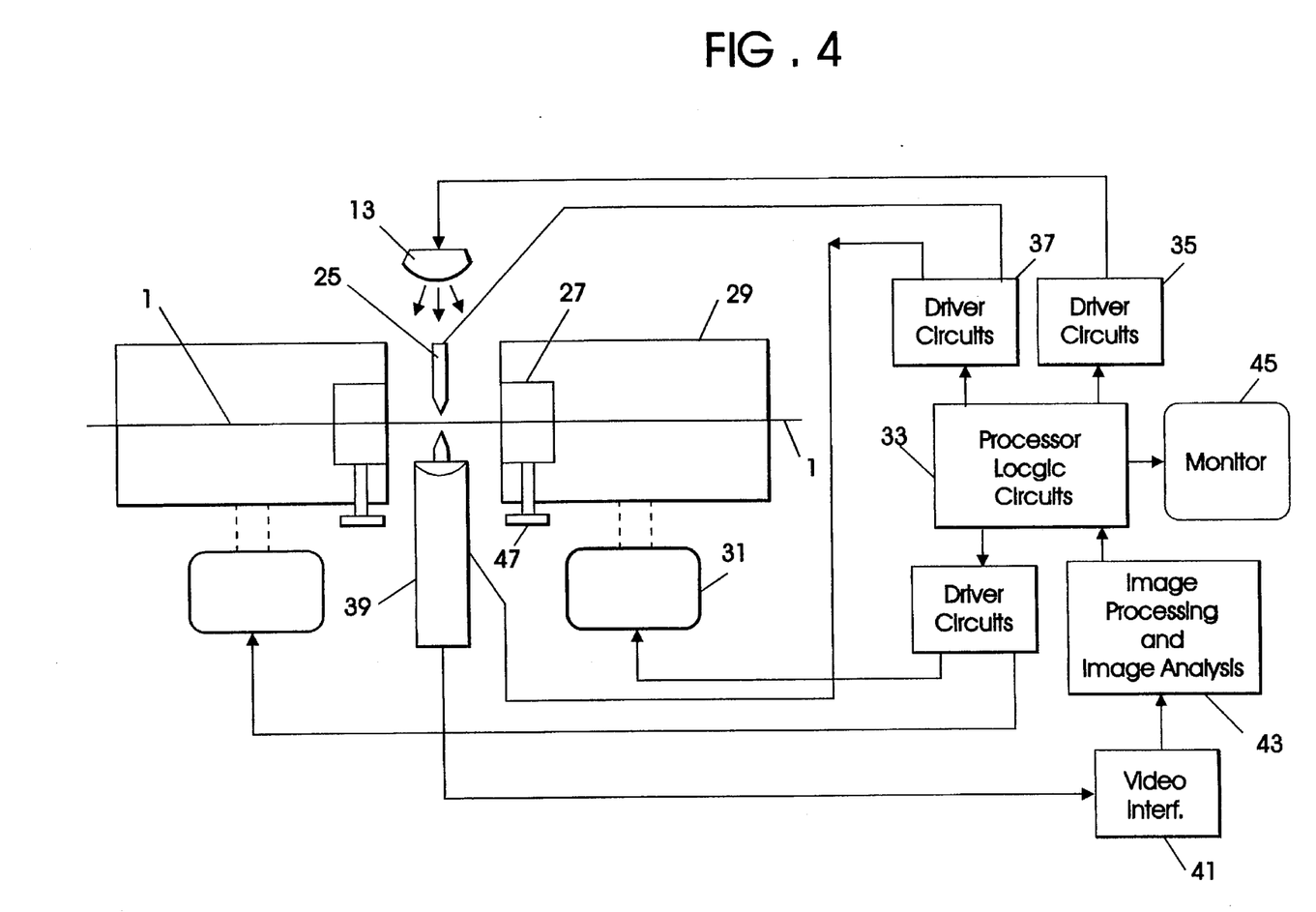

A device for splicing two optical fibers is schematically shown in FIG. 4. This device is principally a conventional automatic splicing device for optical fibers supplemented with devices for orienting the fibers angularly and possibly also provided with special routines for analysing the determined intensity curves. FIG. 4 is also schematic having some parts of the optical system omitted, so that for instance no lenses and prisms are illustrated and only a single light source 13.

The two optical fibers which are to be spliced to each other, are placed with their ends in special retainers 27, by means of which the fibers can be rotated about their longitudinal axes. These retainers 27 are, in addition, arranged on the usual alignment supports 29 for the fiber ends of the splicing device. The fiber supports 29 can further be operated in relation to each other in the same perpendicular device directions which are indicated by the two light ray directions from the lamps 13 of FIG. 3, and also in the longitudinal direction of the fibers by means of drive motors 31, which are controlled by logical circuits and software in a processor logic module 33. The lamp 33 is activated through its own drive circuits 35 by the processor logic 33. The electrodes 25 are driven by corresponding drive circuits 37 controlled by the processor logic 33. A video camera 39 makes a picture of the fiber ends and provides the corresponding video signals through a video interface 41 to an image processing and image analysis module 43. The result of the image processing and the image analysis in this module 43 is fed to the processor logic module 33 and the result can be shown on a monitor 45. Also the directly obtained picture of the end regions of the fibers as depicted by the video camera 39 can be shown on the monitor 45.

In measurements on and in a possible splicing of two optical fibers they are placed with their ends in the rotational retainers 27, so that the fibers are aligned parallel to and opposite each other. By means of the conventional control through the processor logic module 33 the two fibers are aligned with each other in the cross direction in relation to the longitudinal axes of the fibers and their end surfaces are also brought close to each other. A picture of the end regions of the fibers can then be shown on the monitor 45 and by means of the image processing and image analysis module 43 also curves are shown corresponding to the curves of FIGS. 1c, 1d, 2c, 2d for several different, evenly spaced curves located perpendicularly to the longitudinal directions of the fibers at each side of the intended splice.

By operating operational knobs 47 of the rotational retainers 27 the rotational angles of the fibers are varied from a start position so that curves are obtained for angular values equally distributed over a full turn, for instance as has been proposed above for each tenth degree. The heights h of the light intensity profiles for a considered angular position are determined by analysing the curves automatically, determination of the heights of their central peaks and then calculating the average of several such heights. Corresponding numerical values for each fiber end can then continuously be shown on the monitor 45. When the fibers are rotated or rolled by means of the operational knob 47 the position of the fibers can need to be adjusted in order to be still observed and it is performed as earlier by the automatic alignment control in the processor logic module 33 by activation of the control motors 31 for the retainers 29.

By the method described above, now, the determined h values for the two fibers can be evaluated for determination of the offset between the angular positions about the longitudinal axis of the fibers for the optically interfering regions of the optical fibers in their start positions and thus how much the fibers are to be rotated in relation to each other in order to align these regions of the fibers with each other.

When a splicing of the fibers is to be performed, now the fibers are rotated in relation to each other, practically one fiber is rotated from its start position and, the other one maintaining its start position, through an angle equal to the determined angular offset, so that the angular position about the longitudinal axis of the respective fiber for the optically interfering regions will be the same and in the special case that the polarization planes or the planes through the stress zones or the fiber cores are located at the same angle. Then the fibers are aligned with each other in their longitudinal direction again by means of the automatic alignment control in the processor logic module 33, by activating the control motors 33 for the retainers 29 in a suitable way. After that the end surfaces of the fibers are moved to be engaged with each other or to be very close to each other, after which electric voltage is supplied to the electrodes 25 and a suitable heating and welding current is allowed to pass therebetween during a suitably chosen time whereby the ends of the two fibers are melted together. After the fiber ends have cooled, the fiber joint is finished.

We claim:

1. A method for determination of an offset between angular positions about longitudinal axes of axial optical asymmetries, including optically inhomogeneous regions, located in parallel to longitudinal axes of two cylindrical bodies located in arbitrary angular start positions, comprising the steps of:

illuminating the bodies by a light beam, substantially perpendicularly to the longitudinal directions of the bodies, the light beam comprising light for which the bodies are transparent, rotating each one of the bodies through a predetermined angular interval, at least half a full turn for a body having a corresponding symmetry, from its start angular position about its longitudinal axis, during the rotation for different angular positions, determining a difference between light intensity of light, which has passed through the body and in its position corresponds to a central portion of the body as seen in the longitudinal direction, and of light which has passed through the body and in its position corresponds to a region located most close to and outside the body, comparing the determined differences for one of the bodies to the differences for the other one of the bodies and determining from this comparison the angular offset from the angular position of one body in relation to its start angular position which, if it would have been the angular start position, had given the best agreement between the determined differences for this body and the differences for the other body, and added thereto a constant angular value which is characteristic to the two bodies when they are of different kinds.

2. The method of claim 1, wherein the determination of the differences is made along a line which forms a large angle to the longitudinal axis of the corresponding body and passes at least close to a focal line for the body considered as an optical lens.

3. The method of claim 1, wherein in the determination of the differences for different angular positions for a body, for each angular position, a light intensity curve is determined along a straight line which forms a large angle to the longitudinal axis of the body, whereafter this curve is evaluated for determination of a difference between a central portion of the curve and portions of the curve located adjacent to the central portion.

4. The method of claim 3, wherein for each angular position light intensity curves are determined for several such straight lines spaced from each other; and in the determination of the difference for a considered angular position, an average is used of the differences determined for the curves which are determined for this angular position.

5. The method of claim 1, wherein the agreement between differences deteremined for one of the bodies and differences for the other one of the bodies is determined by means of a correlation function C according to $$C = \frac{\left( N \sum_{i=1}^{N} p_i q_i - \sum_{i=1}^{N} p_i \sum_{i=1}^{N} q_i \right)^2}{\left[ N \sum_{i=1}^{N} p_i^2 - \left( \sum_{i=1}^{N} p_i \right)^2 \right] \cdot \left[ N \sum_{i=1}^{N} q_i^2 - \left( \sum_{i=1}^{N} q_i \right)^2 \right]}$$

where a large value of C means a good agreement which $p_i$ and $q_i$ are difference values for said one of bodies and the other of the bodies, respectively.

6. The method of claim 1, wherein for the determined differences for a body as a function of the angular rotation, an interpolation function is determined from which further interpolated difference values are determined for comparison to the differences determined of the other body.

7. A method, using the method according to claim 1, of splicing two optical fibers, each of which comprises at least one axial asymmetry, including at least one optically inhomogenous region extending in a longitudinal direction of the fiber eccentrically located in relation to a longitudinal axis of the fiber, comprising the steps of:

placing end surface of the optical fibers close to each other and opposite to each other with the longitudinal axes of the fibers substantially aligned with each other, rotating the ends of the fibers about their longitudinal axes in order to have an angular position in relation to each other such that an alignment is obtained between the axial asymmetries, and between the optically inhomogenous regions in the fiber ends, and fixing the fiber ends in this positions in relation to each other, and connecting the fibers by heating and melting together regions at the end surfaces of the fibers, wherein the rotation of the end of the fibers in relation to the end of the other one of the fibers is made through an angular amount corresponding to the angular offset determined for the two fiber ends.

8. The method of claim 7, wherein in the determination of the angular offset the fiber ends located close to each other are illuminated from the side thereof simultaneously with the same light beam.

9. A method, using the method according to claim 1, of spacing two optical polarization maintaining fibers, comprising the steps of:

placing end surfaces of the optical fibers close to each other and opposite to each other with longitudinal axes of the fibers substantially aligned with each other, rotating the ends of the fibers about their longitudinal axes in order to have an angular position in relation to each other such that alignment is obtained between polarization axes of the fiber ends, and fixing the fiber ends in this position in relation to each other, and connecting the fibers by heating and melting together regions at the end surfaces of the fibers, wherein the rotation of the end of one of the fibers in relation to the end of the other one of the fibers is made through an angular amount corresponding to the angular offset determined for the two fiber ends.

10. The method of claim 1, wherein the determinations of the difference are made over angular positions evenly distributed over the total angular interval.

11. A method for determination of an angular offset between polarization axes and about longitudinal axes of two ends of optical polarization maintaining fibers, located in arbitrary angular start position, comprising the steps of:

illuminating the fiber ends by a light beam, substantially perpendicularly to the longitudinal directions of the fibers, the light beam comprising light for which the fibers are transparent, rotating each one of the fiber ends through a predetermined angular interval, at least half a full turn for an end of a fiber having a corresponding symmetry, from its start angular position about its longitudinal axis, during the rotation for different angular positions, determining a difference between light intensity of light, which has passed through the fiber end and in its position corresponds to a central portion of the fiber end, as seen in the longitudinal direction, and of light which has passed through the fiber end and in its position corresponds to a region adjacent the central portion of the fiber end, and comparing the determined differences for one of the fiber ends to the differences for the other one of the fiber ends, and from this comparison, determining the angular offset from the angular position of one fiber end in relation to its start angular position which, if it would have been the angular start position of the fiber end, had given the best agreement between the determined differences for this fiber end and the differences for the other fiber end, and added thereto a constant angular value which is characteristic to the two fibers when they are of different kinds.

12. A device for determination of an offset between angular positions about longitudinal axes of axial, optical asymmetries, including optically inhomogeneous regions, located in parallel to longitudinal axes of two cylindrical bodies located in arbitrary angular start positions, including two ends of optical fibers, comprising:

means for illuminating the bodies with a light beam, wherein the illuminating means can be arranged to provide at least one of a parallel light beam and a light beam having a direction substantially perpendicular to the longitudinal axes of the bodies, means for rotating each one of the bodies a predetermined angular interval, at least half a full turn, from its angular start position about its longitudinal axis, means for determining during the rotation for different angular positions differences between a light intensity of light which has passed through the body and its position corresponds to a central longitudinal portion of the body and a light intensity of light which has passed through the body and in its position corresponds to regions adjacent the central longitudinal portion of the body, means for comparing a determined difference for one of the bodies to differences for the other one of the bodies and for determining from this comparison an angular position for one body in relation to its angular start position which, if it would have been exactly the start position before the rotation, had given the best agreement between the determined differences for this body and the differences for the other body, and means for determining the angular position as a sum of an angle which corresponds to this angular position and which indicates the difference between the angular positions about the longitudinal axes of the bodies for the axial asymmetries, in particular for the optically inhomogeneous regions of the bodies, and of a constant angular value which is characteristic to the bodies and is equal to zero for identical bodies.

13. The device of claim 12, wherein the means for determining the differences for different angular positions comprises means for determining for each such angular position the light intensity along a straight line which is substantially perpendicular to the longitudinal axis of the body and at least passes close to a focal region formed by light rays in the light beam which has been focused by a main portion of the body.

14. The device of claim 12, wherein the means for determining the differences for different angular positions comprises:

means for determining for each such angular position a light intensity curve along a straight line substantially perpendicular to the longitudinal axis of the body, and means for evaluating such curves for determination of differences between a central portion of the curve and regions of the curve located adjacent to the central portion of the curve.

15. The device of claim 12, wherein the means for determining for each angular position a light intensity curve determines light intensity curves along several such straight lines spaces for each other, and the means for evaluating such curves, in the determination of the difference for a considered angular position, determines the difference as an average of the difference determined from the curves determined for this angular position.

16. The device of claim 12, wherein the means for comparing the determining differences and for determining the angular position determines a degree of agreement between differences $p_1, p_2, \ldots p_N$ for one of the bodies and difference $q_1, q_2, \ldots q_N$ for the other of the bodies by calculating a correlation function C according to $$C = \frac{\left(N \sum_{i=1}^{N} p_i q_i - \sum_{i=1}^{N} p_i \sum_{i=1}^{N} q_i\right)^2}{\left[N \sum_{i=1}^{N} p_i^2 - \left(\sum_{i=1}^{N} p_i\right)^2\right] \cdot \left[N \sum_{i=1}^{N} q_i^2 - \left(\sum_{i=1}^{N} q_i\right)^2\right]}$$

where a large C value means a good agreement wherein p and q are vectors representing the difference angular positions.

17. The device of claim 12, further comprising means, for the determined differences for a body as a function of angular position, for determining an interpolation function and for determining therefrom further interpolated difference values, and wherein the means for comparing the determined differences and for determining the angular position uses these interpolated difference values for comparison to the difference values for the other body.

18. A splicing device, using the device of claim 12, for splicing the ends of two optical fibers, each of which comprises at least one axial asymmetry, in particular at least one optically in homgeneous region extending in a longitudinal direction of the fiber and eccentrically located in relation to a longitudinal axis of the fiber, the splicing device comprising:

means for placing end surfaces of the optical fibers close to each other and opposite to each other with the longitudinal axes of the fibers substantially aligned with each other, means for connecting the fiber ends to each other, and means for rotating the end of one of the fibers about its longitudinal axis in relation to the end of the other one of the fibers through and angular amount corresponding to the angular offset determined for the fiber ends such that an alignment between the axial asymmeteries, and between the optically inhomgeneous regions in the fibers, is obtained.

19. The device of claim 18, wherein the illuminating means comprises a light beam arranged to simultaneously and from the sides thereof illuminate the fiber ends located close to each other.

20. A splicing device, using the device of claim 12, for splicing ends of two polarization maintaining fibers, the splicing device comprising:

means for placing end surfaces of the optical fibers close to each other and opposite to each other with longitudinal axes of the fibers substantially aligned with each other, means for connecting the fiber ends to each other, means for rotating the end of one of the fibers about its longitudinal axis in relation to the end of the other one of the fibers through an angular amount corresponding to the angular offset determined for the fiber ends such that an alignment between polarization axes of the fibers is obtained.

21. The device of claim 12, wherein the determinations of the difference are made over angular positions evenly distributed over the total angular interval.

22. A device for determination of an angular offset between polarization axes of two ends of optical polarization maintaining fibers, located in arbitrary angular start positions, comprising:

means for illuminating the fiber ends with a light beam, wherein the illuminating means can be arranged to provide at least one of a parallel light beam and a light beam having a direction substantially perpendicular to longitudinal directions of the fiber ends, means for rotating each one of the fiber ends a predetermined angular interval at least half a full turn, from its angular start position about its longitudinal axis, means for determining during the rotation for different angular positions differences between a light intensity of light which has passed through the fiber end and its position corresponds to a central longitudinal portion of the fiber end and light intensities of light which has passed through the fiber end and in its position corresponds to regions located adjacent the central longitudinal portion of the fiber end, means for comparing a determined difference for one of the fiber ends to the differences for the other one of the fiber ends and for determining from this comparison an angular position for one of the fiber ends in relation to its angular start position which, if it would have been exactly the start position before the rotation, had given the best agreement between the determined differences for this fiber end and the differences for the other fiber end, and means for determining the angular offset as a sum of an angle which corresponds to this angular position and which indicates a difference between the angular positions about the longitudinal axes of the polarization axes and a constant angular valve which is characteristic to the fiber ends and is equal to zero for ends of identical fibers.

23. A method for determining an angular offset between optically interfering regions of optical fibers comprising the steps of:

illuminating the optical fibers with a light beam to which the optical fibers are transparent;

rotating each of the optical fibers about its longitudinal axis from a starting angular position through an angular interval;

determining, for each of a plurality of angular positions of each of the optical fibers, a difference between an intensity of light which has passed through the optical fiber and is emitted through a central portion thereof and an intensity of light which has passed through the optical fiber and is omitted through a portion outside of said central portion; and correlating the differences determined for one of said optical fibers with those differences determined for another of said optical fibers to determine said angular offset.

24. The method of claim 23, wherein said step of determining further comprises the step of:

evenly spacing said plurality of angular positions within said angular interval.

25. The method of claim 24, wherein said step of comparing further comprises the step of:

evaluating the following correlation function $$C = \frac{\left( N \sum_{i=1}^{N} p_i q_i - \sum_{i=1}^{N} p_i \sum_{i=1}^{N} q_i \right)^2}{\left[ N \sum_{i=1}^{N} p_i^2 - \left( \sum_{i=1}^{N} p_i \right)^2 \right] \cdot \left[ N \sum_{i=1}^{N} q_i^2 - \left( \sum_{i=1}^{N} q_i \right)^2 \right]}$$

where $P_i$ represents the differences associated with said one of said optical fibers and $q_i$ represents the differences associated with said another of said optical fibers.

26. The method of claim 24, further comprising the step of:

adding a constant angle to said angular offset when said optical fibers are of different types.

* * * * *